March 3, 1970        L. W. GOOSS, JR        3,498,144

STABLE TWO-AXIS CASE ROTATING GYROSCOPES

Filed March 21, 1962        5 Sheets-Sheet 1

LAWRENCE W. GOOSS, Jr.
INVENTOR.

ATTORNEYS

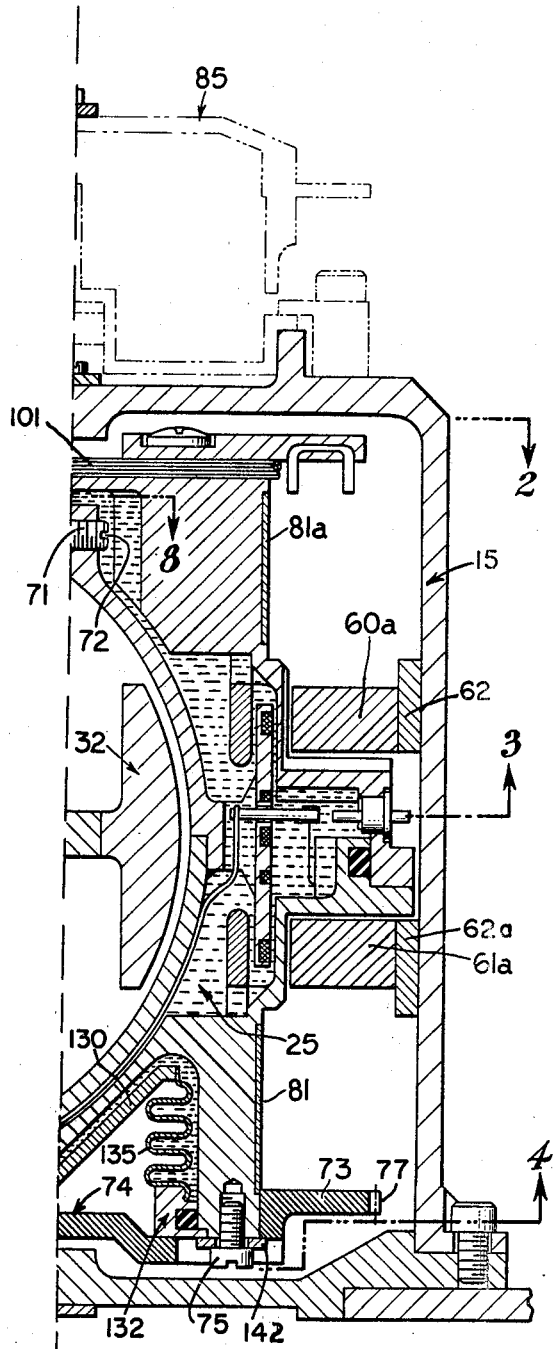

LAWRENCE W. GOOSS, Jr.
INVENTOR.

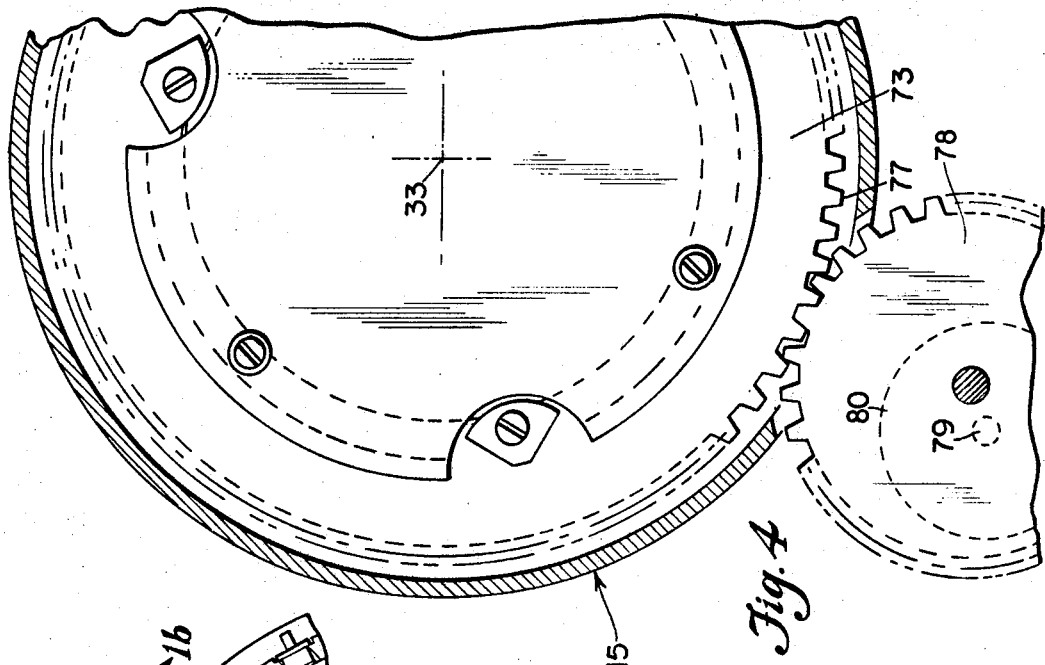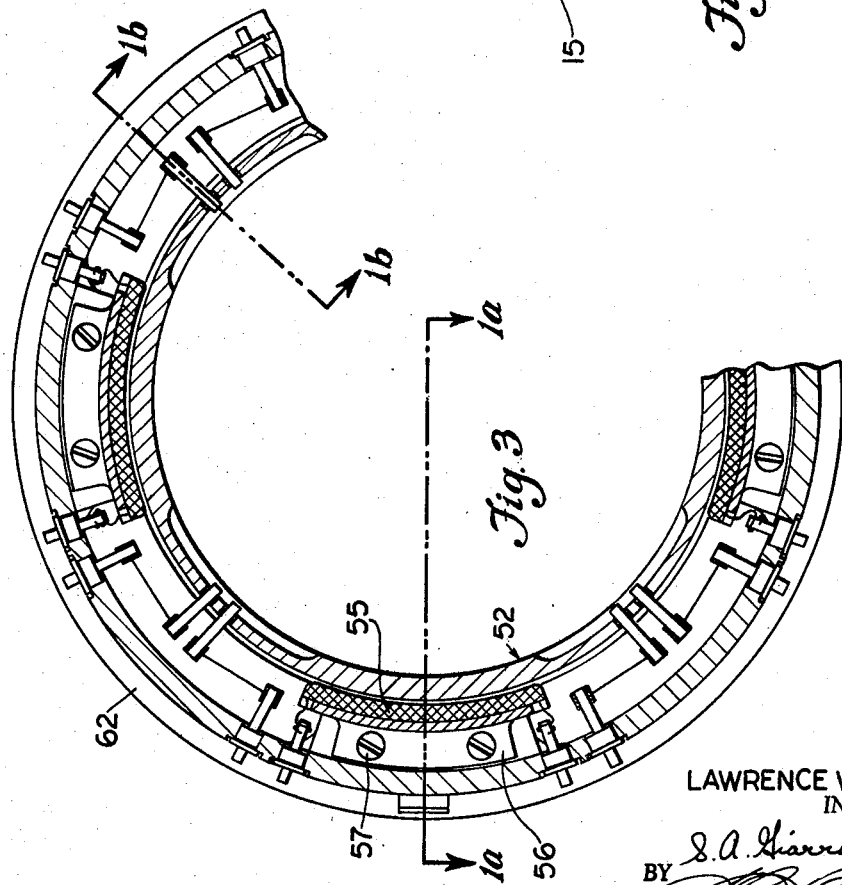

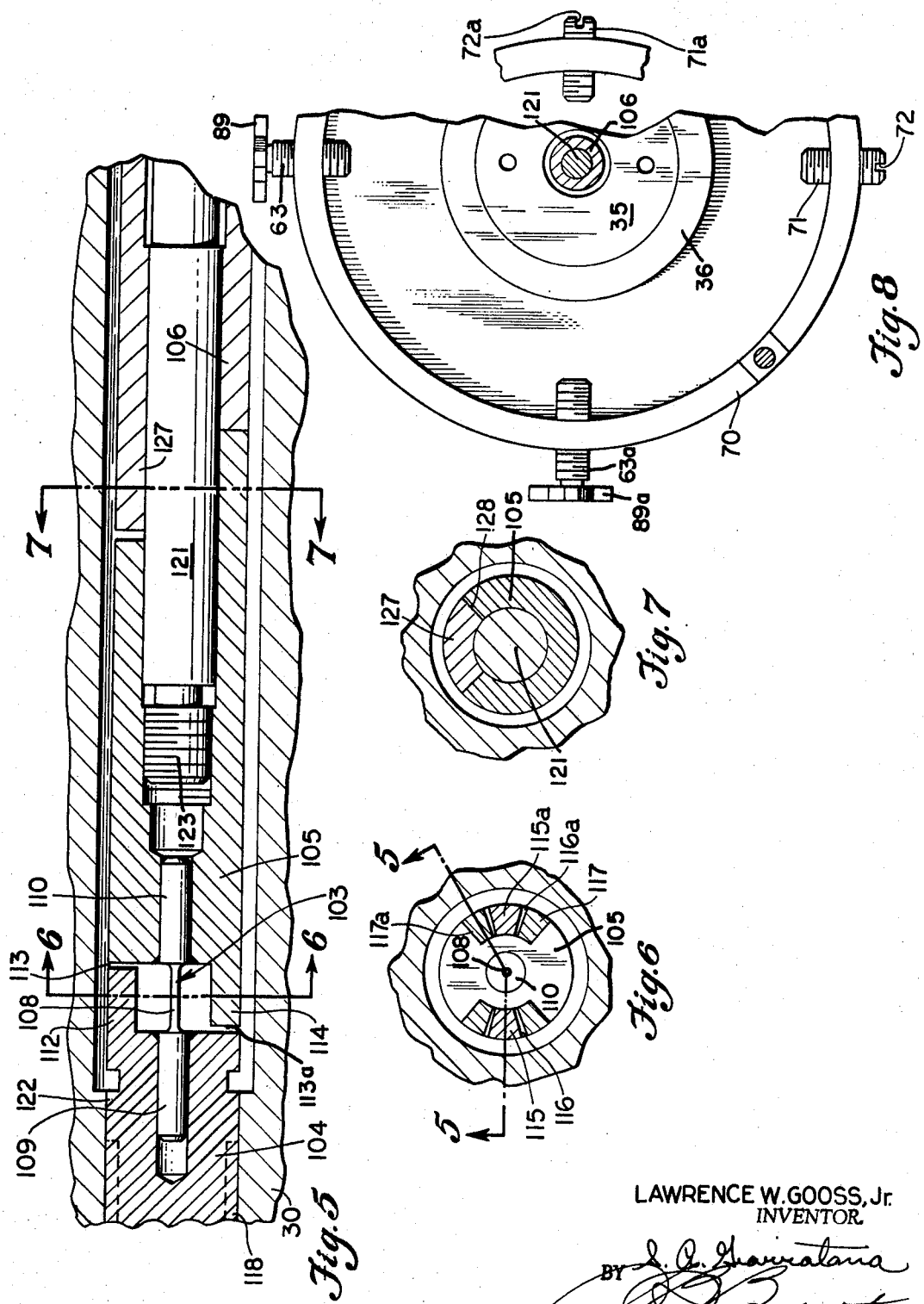

United States Patent Office 3,498,144
Patented Mar. 3, 1970

3,498,144
STABLE TWO-AXIS CASE ROTATING GYROSCOPES
Lawrence W. Gooss, Jr., Oakland, N.J., assignor to Singer-General Precision Inc., a corporation of Delaware
Filed Mar. 21, 1962, Ser. No. 181,288
Int. Cl. G01c *19/14*
U.S. Cl. 74—5                    15 Claims This invention relates to gyros for use in navigation systems for aircraft, and the like, and is particularly directed to a two-axis stable gyro, in which the float is rotated.

The fundamental general object of the invention is to provide a novel two-axis case-rotating floated gyro.

A more specific object is to provide an improved case-rotated gyro in which case rotation is achieved by drive means independent of the gyro spin motor.

Another object of the invention is to provide a novel case-rotated floated gyro having a flexure pivot suspension permitting limited angular displacement of the spin motor-flywheel-float assembly relative to the rotated case.

A further object is the provision of an improved gyro construction as characterized in the immediately preceding object in which the flexure pivot suspension is protected against damage from either or both compression loads and excessive torsional loads.

To the fulfillment of these and other objects the invention contemplates a two-axis case-rotating gyro comprising an outer housing and a hollow inner case disposed within the outer housing for rotation about an axis fixed with respect to the housing. A hollow float of generally spherical outer contour is fitted to the interior of the inner case, the volume bewteen the inner surface of the case and the float being filled with a flotation fluid. A tubular shaft, coaxial with the axis of rotation of the case, extends through the float and a flexure support member, secured to the inner case, extends substantially coaxially into the tubular shaft. Flexure means, supported by the flexure support member, provide a high compliance connection between the float and inner case which allows limited angular displacement of the float relative to the rotational axis of the inner case.

Further objects of the invention, its advantages, scope, and the manner in which it may be practiced will be more fully apparent to persons conversant with the art from the following description of an exemplary embodiment thereof taken in conjunction with the sub-joined claims and the annexed drawings in which like parts are designated by like reference numerals throughout the several views, and FIGS. 1a and 1b jointly constitute a sectional view through the spin axis of a gyroscope in accordance with the present invention;

FIG. 3 is a fragmentary view partially in section on line 3—3 in FIG. 1;

FIG. 4 is a fragmentary view partially in section on line 4—4 in FIG. 1;

FIG. 5 is a fragmentary view showing a portion of FIGURE 1a on an enlarged scale;

Figure 1A:
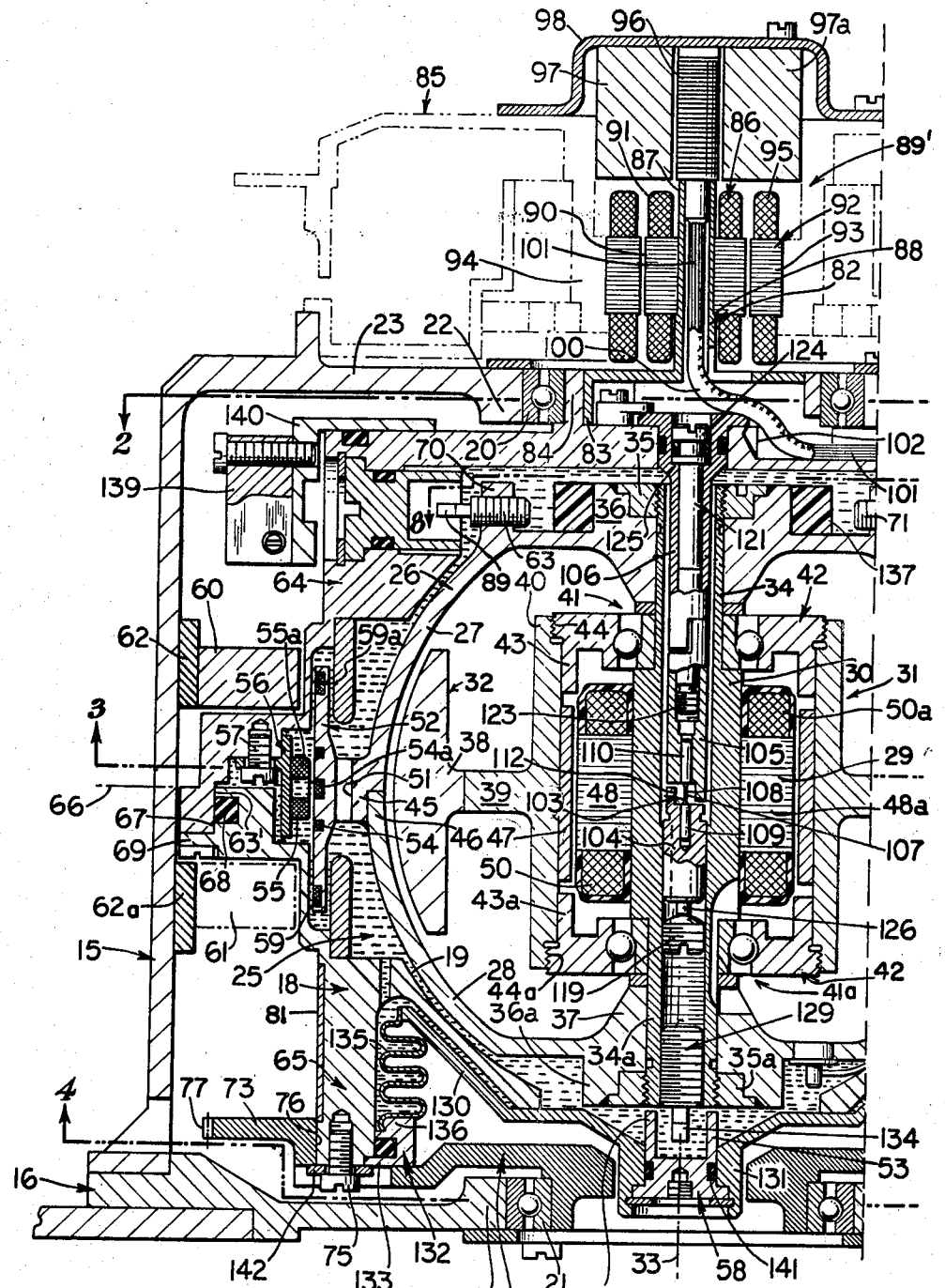

FIGS. 6 and 7 are respective sections on lines 6—6 and 7—7 in FIG. 5; and

FIG. 8 is a sectional view on line 8—8 in FIG. 1.

Referring now to the drawings and first, particularly, to FIG. 1, one gyroscope construction embodying the present invention comprises a hollow, open-ended cylindrical outer housing 15 having a base plate 16 attached to the lower end thereof.

A hollow cylindrical inner case 18 is supported within outer housing 15 for rotation about axis 33 by a pair of anti-friction bearings 20, 21, coaxially mounted in respective annular bosses 22, 24, the former on the inner surface of housing upper wall 23 and the latter on base plate 16.

A thin-walled float 26, formed in two sections 27, 28, has a generally spherical outer surface conforming to spherical segmental surfaces 19 on the interior of case 18. The two float sections are united by means of a circumferential rim 45 on the upper section 27 internally grooved to receive the circumference of the lower section 28, the joint being welded or otherwise permanently bonded. An annular coil support member 52 is fitted on the outer surface 51 of rim 45, thus coaxially girdling the spherical float 26. A tubular shaft 30 extending axially through float 26 defines the spin axis of the gyro, supporting the stator 29 of a spin motor 31 which drives a flywheel assembly 32; in the absence of an input rate and neglecting drift the spin axis of the gyro coincides with case rotation axis 33. Reduced diameter end portions 34, 34a on shaft 30 terminate in threaded engagement with bushings 35, 35a, respectively, welded or otherwise attached to internal, coaxial bosses 36, 37 on the upper and lower sections of the float.

The volume between the inner surface of inner case 18 and the outer surface of the float 26 is filled with a flotation fluid 25 which supports the float 26.

Flywheel assembly 32 comprises a rim 38, the circumferential surface of which conforms to the spherical inner surface of the float 26. Rim 38 is fixedly attached to the supported on a hollow cylindrical hub section 40 by means of a coaxial annular web 39. Hub section 40, which serves as the rotor of spin motor 31, is coaxially rotatably mounted on shaft 30 by angular contact ball or other suitable anti-friction bearings 41, 41a.

The respective outer race members 42, 42a of bearings 41, 41a are coaxially fixed to the ends of hub 40 by means of pilot flanges 43, 43a and threaded engagement indicated at 44, 44a.

Stator 29 of spin motor 31 is disposed within rotor hub 40 and includes a plurality of radially extending poles 48, 48a provided with windings 50, 50a to drive the rotor 47 in the conventional manner.

The outer circumferential surface of the coil support member 52 is grooved to receive a plurality of primary pick-off coils 54, 54a, 54b longitudinally spaced with respect to case rotation axis 33, which coact with a pair of secondary pick-off coils 55 on a support bracket 56 fixed to inner case 18 as by a plurality of screws, one of which is shown at 57 in FIG. 1. If desired secondary pick-off coils, 55, 55a may be mounted on stationary outer housing 15 in a manner similar to permanent magnets 60, 60a, 61, 61a, hereinafter described.

The pick-off coils transmit a signal indicating the angular displacement of the float 26 relative to the inner case 18 about two axes in a plane perpendicular to case rotation axis 33.

Additional grooves adjacent the respective edges of the coil support member remote from pick-off coils 54, 54a, 54b contain torquer coils 59, 59a which co-act with permanent magnet segments, 60, 60a, 61, 61a mounted on axially-spaced annular rings 62, 62a fastened to the inner surface of the outer housing 15. As appears from FIGURES 1 and 2, magnets 60, 60a are mounted on ring 62 at opposite ends of a diametral axis thereof and magnets 61, 61a are mounted on ring 62a at opposite ends of a diametral axis thereof perpendicular to that of ring 62. Thus the magnets are circumferentially spaced at 90° intervals about, and at equal radial distances from, case rotation axis 33.

Figure 2:
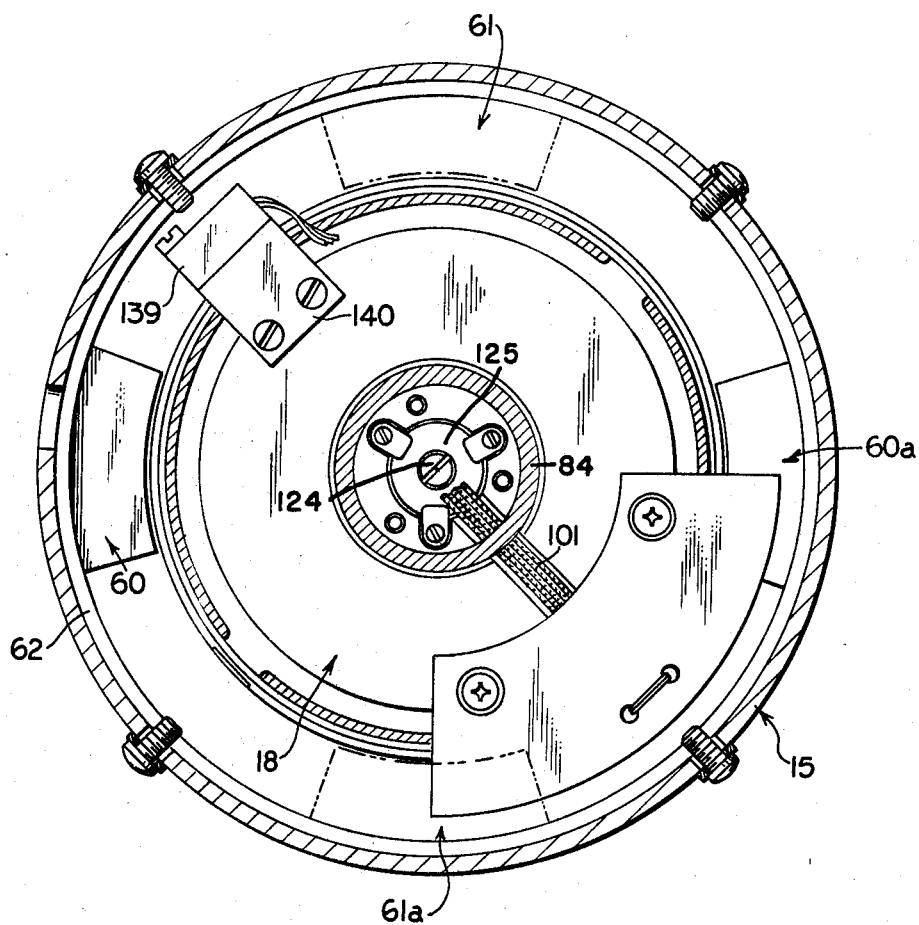
FIG. 2 is a view partially in section on line 2—2 in FIG. 1.

The torquer coils 59, 59a function to exert a force on float 26 opposing its displacement about two axes in a plane perpendicular to case rotation axis 33 in a manner hereinafter described. The two axes normally coincide with diametral axes through pairs of permanent magnets 60, 60a and 61, 61a as shown in FIGURE 2.

Like float 26, rotating inner case 18 is also formed in two sections, viz., upper section 64 and lower section 65 joined near and parallel to the transverse axis of symmetry 66 of the gyro rotor. To this end bottom flange of the upper section 64 has a depending circumferential flange containing a counterbore 67 receiving an annular pilot shoulder 63' on the lower section to align the two sections. An O-ring 68 or the like fitted to pilot shoulder 63 seals the two sections.

A plurality of headed screws or similar fasteners, inserted through a circumferential flange 69 on lower section 65 and threaded into the depending flange on upper section 64, fasten the two together.

As shown in FIGS. 1a, 1b and 4 a plurality of pairs of float-balancing weights are provided on a concentric annular rim 70 on the upper section of float 26. One pair of balance weights 71, 71a take the form of headless screws threaded into rim 70 at points spaced 90° from one another about axis 33. Screws 71, 71a contain respective kerfs 72, 72a to facilitate rotative adjustment relative to rim 70. The second pair of balance weights takes the form of screws 63, 63a also threaded into rim 70 at points circumferentially spaced at 90° intervals about axis 33 with respect to each other and to weights 71, 71a. T-bars 89, 89a on the radially outer ends of screws 63, 63a facilitate rotative adjustment of the screws. The balance of the float 26 is adjusted by selectively turning appropriate screws 63, 63a and 71, 71a.

In order to drive the inner case 18, a ring gear 73 having external teeth 77 is provided on an annular cover 74 attached to the lower end of the inner case by a plurality of headed screws 75, or other suitable attaching means. In order to insure accurate alignment of ring gear 73 with the inner case, an annular shoulder 76 is provided which is concentric with the ring gear and accurately fitted to a pilot section on the case.

Ring gear 73 meshes with a gear 78, shown in FIG. 4, driven from the shaft 79 of a motor 80 or the like. A speed reduction gear mechanism (not shown) interposed between motor shaft 79 and gear 78 sharply reduces the speed of ring gear 73 relative to the shaft of the motor. In order to heat the interior of inner case 18 and the flotation fluid combination heating coils and temperature sensors 81, 81a are provided on the outer diameter of the inner housing, adjacent the upper and lower ends thereof, as best appears in FIG. 1b. The sensors attached to the heating coils indicate the temperature of the inner case 18.

A hollow stub shaft 82 is provided on the upper end of inner case 18 extending co-axially with axis 33. Shaft 82 is integral with and projects from a coaxial, hollow, cylindrical hub received within an annular rib 84 on the upper section of the inner case; annular rib 84, in turn, is received within the inner race of the bearing 20 which journals the upper end of the inner case 18 in housing 15.

A resolver 89' has its rotor 86 coaxially mounted on stub shaft 82 as by means of a press fit of laminated core 90 on a reduced diameter end segment 87, of the shaft; a shoulder 88 formed at the juncture of the reduced diameter segment with the remainder of shaft 82 establishes the longitudinal position of the rotor relative to the shaft. Conventionally, rotor core 90 carries a plurality of windings 91.

Resolver 89 includes a stator 92, supported by an inner roll gimbal 85 of the platform which is rotatably supported by the upper wall 23 of outer housing 15; the stator coaxially surrounds rotor 86 of the resolver as shown in FIG. 1.

Resolver stator 86 includes a multi-pole laminated core 93 mounted in a bracket 94 on inner roll gimbal 85 of the platform and carrying winding 95. Because the resolver stator is attached to the inner roll gimbal of the platform, the need for further azimuth co-ordinate resolution is eliminated.

The upper end of the reduced diameter shaft segment 87 carries a group of coaxial slip rings 96 contacted by brushes on a pair of brush blocks 97, 97a supported alongside the slip rings by an inverted cup-shaped cap 98 on inner roll gimbal 85.

A cable 100, having a plurality of individual conductors 101 connected at one end to slip rings 96, extends downwardly through the interior of the stub shaft 88 to a point below its hub section 83, thence outwardly through an opening 102 in the upper wall of inner case 18 for external connection, in the manner shown in FIG. 1.

The output signal of the secondary pick-off coils 55 (shown in FIG. 1), indicative of the angular position of the float about axes perpendicular to axis 33, is fed to the rotor of the resolver, which is attached to the inner case 18.

A flexure mechanism, which allows the float 26 and the flywheel assembly 32 to be angularly displaced through a limited range relative to axis 33, is disposed within tubular central shaft 30. The flexure mechanism includes a support member formed of three cylindrical segments 104, 105 and 106 and a flexure member 103 all co-axial with case rotation axis 33 of the gyro. Flexure member 103 is a monolithic structure formed of a hard material such as quartz. Elgiloy, or the like and comprises three longitudinal segments: a central or actual flexure segment 108, which is of extremely small diameter, and cylindrical lower and upper body segments 109 and 110 which are pressed into, welded, brazed or otherwise fixedly secured in respective axial bores in the upper end of the lower support section 104 and the lower end of the intermediate sehtion 105 of the flexure support member.

As shown in FIG. 6, diametrically aligned splines 115, 115a are formed integral with the dependency 114 of the intermediate section 105 fitted to a mating radial slot 116, formed between a pair of splines 117, 117a integral with the dependency 112. There is sufficient clearance between the mating slots and splines to permit a total relative angular displacement of approximately 10° between support sections 104 and 105 thus limiting torsional strain of flexure segment 108 to 5° in each direction from its unstressed condition.

The lower section 104 of the flexure support member is externally threaded as at 118 (FIG. 5), the threads being fitted to an internally threaded opening in the tubular central shaft 30. A substantially cylindrical pilot land 122, integral with the upper end of lower flexure support section 104, accurately centers and positions the lower section relative to the central shaft 30 of the float.

Reverting to FIGURE 1, the lower end of the lower flexure support section 104 has a central tang 126 integral therewith to facilitate its longitudinal adjustment. An externally threaded lock screw 119 is adapted to engage the tang 126 and thereby lock the lower section 104 in place.

The lower section 104 of the flexure support member is longitudinally displaced to allow flotation fluid to be fed into the interior of the tubular shaft 30. The lower section 104 of the flexure support member and the screw 119 each has a radial groove in the outer circumference thereof to facilitate transfer of flotation fluid from the upper portion of the tubular shaft 30 to the lower portion thereof.

An externally threaded plug 129 in lower end of shaft 30 seals against escape of the flotation fluid. The lower end of plug 129 has a T-bar 134 integral therewith and extending downwardly therefrom to facilitate rotation and longitudinal adjustment of the plug 129 relative to the central shaft 30.

A shouldered nut 58, carrying an external O-ring and threaded into the lower end of the support cap 130, seals the opening in the cap to detail the flotation fluid within the area in the inner case surrounding the float 26.

The nut 58 has a pair of tangs 138 integral therewith adapted to engage the T-bar of plug 129, thus enabling longitudinal displacement thereof after the interior of shaft 30 is filled with flotation fluid. This facilitates balancing the float 26 after the area of the inner case surrounding the float and the interior of the central shaft 30 are filled with flotation fluid.

A long screw 121 has an unthreaded shank portion inserted through an axial bore in upper flexure support section 106, and an externally threaded end 123 threaded in a tapped axial bore in intermediate section 105 of the flexure support member. Screw 121 retains the intermediate section 105 of the flexure support member in longitudinal alignment with the upper section 106 thereof.

Adjustment screw 121 has a slotted cylindrical head received in a counterbore in the upper end of support section 106 and engaging a shoulder 125 at the bottom of the counterbore. Rotation of screw 121 enables adjustment of the longitudinal position of intermediate section 105 which supports the upper body section 110 of flexure segment 108.

As shown in FIGS. 5 and 7, the lower end of upper flexure support section 106 has a longitudinal extension 127 in the form of a hollow cylindrical segment fitting into a complementary mating slot 128 in the upper end of the intermediate flexure support section 105.

As shown in FIG. 1, a dished circular flexible bellows support cap 130 is provided with a tubular central hub 131 disposed coaxially within a central opening in annular cover 74, attached to inner case 18. A ring 132, having an integral annular flange 133, is mounted at the lower end of inner case 18, with the flange clamped in an annular recess in the bottom surface of the inner case by respective washers 142 each of which is supported by a cap screw 75, threaded into the inner case. A tubular flexible bellows 135 has its upper end welded, brazed or otherwise fixedly attached to the outer circumference of the support cap 130 and its lower end similarly attached to an annular flange 136 on circular ring 132.

Bellows 135 seals the lower end of inner case 18, retaining flotation fluid 25 around the float 26 while providing compensation for the expansion and contraction of the fluid due to variations in temperature.

In order to shift the center of buoyancy and the center of gravity of float 26 into coincidence with the midpoint of flexure segment 108, an annular weight 137, of a plastic material having the same density as the flotation fluid, is provided which may be positioned on the top of the float around hub 36, as shown in FIG. 1a, or at the bottom of the float around hub 36a.

A trim circuit 139 is attached to the upper portion of inner case 18 by an L-shaped bracket 140, which is shown in FIG. 1a. Trim circuit 139 is operative to feed a portion of the excitation signal, received from an external source, to the electrically nulled pick-off secondary windings, controlling and generating a null when the spin axis is aligned with the rotational axis 33 of inner case 18.

The operation of the unit as a gyro is substantially as follows:

In service, the gyro is disposed with its spin axis and case rotation axis 33 coincident and aligned with the local vertical. The spin axis, of course, tends to remain fixed with respect to inertial space unless disturbed. To compensate for earth's rotation and movement of the vehicle on which the gyro is mounted, a signal is fed into torquer 59 which is precisely equal to the earth's rate and the rate of the vehicle.

Any angular displacement of the inner case 18 and the outer housing 15, about an axis in a plane perpendicular to the axis 33, with respect to flywheel 32 and float 26 is detected by the secondary pick-off coils 55, 55a which transmit a proportional signal to rotor 86 of resolver 89. Resolver stator 92 resolves the signal about any axis on which the stator is mounted. An output signal from resolver stator winding 95 is amplified and transmitted to gimbal torquers (not shown) which restore the platform on which the gyro is mounted to its proper vertical position. As torquer coils 59, 59a are mounted on float 26 and coact with permanent magnet segments 60, 61 which are mounted on the interior of the outer housing 15, the need for a resolving torquer is eliminated.

Similarly, the necessity for azimuth resolution is eliminated by the fact that stator 92 of the resolver is mounted on the inner roll gimbal 85 of the platform. The symmetry of the float structure assures low anisoelastic level and the torquer construction allows for high linearity of torque compensating signals.

Although but one preferred embodiment of the invention has been illustrated and described, it will be apparent to those skilled in the art that many changes may be made therein without departing from the spirit and scope of this invention. Accordingly, this invention is to be considered as being limited only by the claims appended hereto.

What I claim is:

1. A two-axis case rotating gyro comprising a hollow outer housing, a hollow inner case fitted to and rotatably supported by the outer housing, the axis of rotation of the inner case being co-axial with one axis of the outer housing, the inner case having a spherical segmental inner surface formed therein, a hollow float of generally spherical segmental outer contour fitted to the interior of the inner case, co-axially with the axis of rotation of the inner case, the volume between the inner surface of the inner case and the float being filled with a flotation fluid, a tubular central shaft fitted to the float, co-axially with the longitudinal axis thereof, a flexure support member fitted to the inner case extending into the tubular central shaft of the float, nominally co-axially with the longitudinal axis of the tubular central shaft, flexure means supported by said flexure support member, co-axiall therewith, said flexure means being operative to allow the float to be angularly displaced relative to the axis of rotation of the inner case about the flexure means, and wherein said flexure support member is formed in a plurality of sections including a first flexure support section fixedly attached to one end of the inner case, a second flexure support section inserted into the tubular shaft of the float between the first flexure support section and the flexure means, co-axially with the flexure means, one end of the flexure means being fixedly attached to the second flexure support section of the flexure support member, and a third flexure support section adjustably fitted to the tubular central shaft of the float, said third flexure support section being located near the end of the flexure means opposite the end attached to the second flexure support section, the end of the flexure means opposite the end attached to the second flexure support section, being fixedly attached to the third flexure support section.

2. In combination with a two-axis case rotating gyro, as in claim 1, a flywheel rotor fitted to the interior of the float, means supported by the tubular central shaft of the float rotatably supporting the flywheel rotor, and means fitted to the tubular central shaft of the float operative to rotatably drive the flywheel rotor.

3. In combination with a case rotating gyro, as in claim 1, a ring gear fixedly attached to one end of the inner case, coaxially therewith, a drive motor having a rotating shaft incorporated therewith mounted near the outer circumference of the ring gear, the axis of rotation of the shaft of the motor being substantially parallel to the axis of rotation of the inner case, a reduction gear mechanism driven by the rotating shaft of the motor, a drive pinion meshing with the ring gear, the axis of rotation of said drive pinion being substantially parallel to the axis of rotation of the ring gear, said reduction gear mechanism being operative to rotatably drive the drive pinion, the shaft of the motor being operative to rotatably drive the ring gear through the reduction gear mechanism driven thereby to reduce the speed of rotation of the ring gear relative to the motor shaft speed.

4. A two-axis case rotating gyro comprising a hollow outer housing, a hollow inner case fitted to and rotatably supported by the outer housing, the axis of rotation of the inner case being co-axial with one axis of the outer housing, the inner case having a spherical segmental inner surface formed therein, a hollow float of generally spherical segmental outer contour fitted to the interior of the inner case, co-axially with the axis of rotation of the inner case, the volume between the inner surface of the inner case and the float being filled with a flotation fluid, a tubular central shaft fitted to the float, co-axially with the longitudinal axis thereof, a flexure support member fitted to the inner case extending into the tubular central shaft of the float nominally co-axially with the longitudinal axis of the tubular central shaft, flexure means supported by said flexure support member, co-axially therewith, said flexure means being operative to allow the float to be angularly displaced relative to the axis of rotation of the inner case about the flexure means, and wherein said flexure support member is formed in a plurality of sections, including a first flexure support section fixedly attached to one end of the inner case, a second flexure support section inserted into the tubular central shaft of the float between the first flexure support section and flexure means, co-axially with the flexure means, means operative to connect the first tubular support section with the second flexure support section, the second flexure support section being located adjacent one end of the flexure means, and a third flexure support section fitted to the interior of the tubular central shaft near the end of the flexure means opposite the end thereof adjoining the second flexure support section, the flexure means including a thin flexure member of substantially cylindrical form, a body section integral with one end of the flexure member, a second body section integral with the end of the flexure member opposite the first body section, means fixedly attaching the first body section of the flexure means to the second flexure support section, and means fixedly attaching the second body section of the flexure means to the third flexure support section.

5. A case rotating gyro, as in claim 4, in which the second flexure support section includes a plurality of radially positioned extensions integral therewith, said extensions being directed longitudinally toward the third flexure support section, the third flexure support secton having a plurality of radially positioned extensions integral therewith, said extensions being directed longitudinally toward the second flexure support section, the extensions integral with the second flexure support section being operative to engage the extensions integral with the third flexure support section to transmit torsional forces from one of said flexure support sections to the other, a narrow longitudinal gap being formed between the extensions integral with the third flexure support section and the second flexure support section, said extensions integral with the third flexure support section, serving as a stop to limit the longitudinal movement of the third flexure support section, relative to the second flexure support section.

6. A two-axis case rotating gyro comprising a hollow outer housing, a hollow inner case rotatably supported by the outer housing, the axis of rotation of the inner case being co-axial with one axis of the outer housing, the inner case having a spherical segmental inner surface formed therein a hollow float of generally spherical segmental outer contour fitted to the interior of the inner case, nominally co-axially with the axis of rotation of the inner case, the volume between the inner surface of the inner case and the float being filled with a flotation fluid, a tubular central shaft fitted to the float co-axially with the longitudinal axis of the float, means fixedly attaching one end of the tubular central shaft to the float, means fixedly attaching the end of the tubular central shaft, opposite the end thereof attached to the float to the opposite end of the float, a flywheel rotor fitted to the interior of the float co-axially with the longitudinal axis of the float, means supported by the tubular central shaft of the float rotatably supporting the flywheel rotor, a flexure support member fitted to the inner case extending into the tubular central shaft of the float, co-axially with the axis of the central shaft, flexure means supported by the flexure support member co-axially therewith, said flexure means being operative to allow the float to be angularly displaced relative to the axis of rotation of the inner case about the flexure means as a center, and wherein said flexure support member is formed in a plurality of sections, including a first flexure support section fixedly attached to the inner case, an annular gap being formed between the first flexure support section and the interior of the central shaft of the float, a second flexure support section inserted into the tubular central shaft of the float, between the first flexure support section and the flexure means, co-axially with the flexure means, means operative to connect the first flexure support section with the second flexure support section, an annular gap being formed between the second flexure support section and the interior of the tubular central shaft of the float, and a third flexure support section fitted to the interior of the tubular central shaft, near the end of the flexure means opposite the end adjoining the second flexure support section, the flexure means including a thin flexure member of substantially cylindrical form, a first attaching means integral with one end of the flexure member, and a second attaching means integral with the end of the flexure member, opposite the first attaching means, means fixedly attaching the first attaching means of the flexure means to the second flexure support section, and means fixedly attaching the second attaching means of the flexure means to the third flexure support section, the annular gaps between the first and second flexure support sections and the tubular central shaft of the float being adapted to allow the tubular central shaft and the float attached thereto, to be angularly displaced relative to the axis of rotation of the inner case about the flexure means as a pivot.

7. A case rotating gyro, as in claim 6, in which the second flexure support section having a plurality of radially positioned extensions integral therewith, said extensions being directed longitudinally toward the third flexure support section, the third flexure support section having a plurality of radially positioned extensions integral therewith, said extensions being directed longitudinally toward the second flexure support section, the extensions integral with the second flexure support section being operative to engage the extensions integral with the third flexure support section to transmit torsional forces from one of said flexure support sections to the other, a narrow longitudinal gap being formed between the extensions integral with the third flexure support section and the second flexure support section, said extensions integral with the third flexure support section, serving as a stop to limit the longitudinal movement of the third flexure support section relative to the second flexure support section, thereby to limit the compressive forces transmitted to the flexure means.

8. In combination with a case rotating gyro, as in claim 6, a first annular coil support member surrounding the outer circumference of the float, the axis of the first coil support member being co-axial with the longitudinal axis of the tubular central shaft of the float, means fixedly attaching the first annular coil support member to the float, a plurality of primary pick-off coils surrounding and supported by the first annular coil support member, said primary pick-off coils being nominally centered relative to the center of the flexure means, a second annular coil support member fixedly attached to the interior of the inner case, said second annular coil support member being spacedly located relative to the first coil support member attached to the float, said second coil support member being nominally co-axial with the axis of rotation of the inner case, a plurality of secondary pick-off coils fitted to and supported by the second coil support member, said secondary pick-off coils surrounding and being located proximate to the primary pick-off coils, said secondary pick-off coils being operative to transmit an electrical signal indicating the rotational angular displacement of the inner case relative to the float, about an axis located in a plane substantially perpendicular to the longitudinal axis of the tubular central shaft supported by the float, said plane being located in substantial alignment with the center of the flexure means.

9. In a two-axis case rotating gyro, as in claim 6, the float having a first weight support means integral with one end thereof, adjacent one end of the tubular central shaft, and a second weight support means integral with the end of the float adjacent the end of the tubular central shaft opposite the first weight support means, a tubular weight fixedly attached to the weight support means at a selected end of the float, said tubular weight being operative to shift the center of gravity and the center of buoyancy of the float to align said center of gravity and center of buoyancy with the center of the flexure means.

10. In combination with a two-axis case rotating gyro, as in claim 6, the inner case having a substantially tubular open section integral therewith, a cover plate attached to the tubular open section of the inner case, a first bellows support member attached to the inner case adjacent the tubular open section thereof, a second bellows support member fitted to the tubular section of the inner case, slidably supported by the cover plate, co-axially with the inner case, the second bellows support member being spacedly located relative to the first bellows support member, a tubular flexible bellows fitted to the tubular open section of the inner case, means fixedly attaching and sealing one end of the tubular bellows to the first bellows support member, means fixedly attaching and sealing the end of the bellows opposite the first bellows support member to the second bellows support member, the bellows in combination with the movable second bellows support member being operative to compensate for variations in volume of the flotation fluid due to temperature variations, thereof.

11. In combination with a case rotating gyro, as in claim 6, a first combination heating element and sensor surrounding the inner case, adjacent one end thereof, said heating element and sensor being co-axial with the axis of rotation of the inner case, a second combination heating element and sensor surrounding the inner case, adjacent the end of the inner case opposite the first heating element and sensor, said heating elements and sensors being operative to heat the inner case and determine the temperature of the flotation fluid contained in said inner case.

12. In combination with a two-axis case rotating gyro, as in claim 6, means fitted to the tubular central shaft of the float operative to rotatably drive the flywheel rotor, the axis of rotation of the flywheel rotor representing the spin vector, the axis of rotation of the inner case representing the rotational vector, a trim circuit attached to the inner case adjacent one end thereof, said trim circuit being operative to control and generate a null electrical signal when the spin vector is aligned with the rotational vector.

13. A two-axis case rotating gyroscope assembly, comprising:
an outer housing;
a hollow inner case supported for rotation about an axis fixed with respect to said outer housing;
a hollow float of generally spherical outer contour, having a tubular shaft extending therethrough along its axis of symmetry, disposed within said inner case with said shaft substantially coaxial to said axis of rotation, the interior surface of the case and the exterior surface of the float defining therebetween a fluid-tight volume for the containment of a body of flotation fluid;
flexure means, extending into said tubular shaft, coupling said float to said inner case with said axis of symmetry and the axis of rotation nominally aligned while permitting limited relative angular displacement between said axes about an orthogonal axis, wherein said flexure means includes:
an elongate, articulated flexure support member co-axially disposed in said tubular shaft with one end fixed thereto and the other end secured to said inner case; and
a flexure member co-axially mounted by, and having a high compliance flexure segment extending between adjacent sections of said articulated support member, and wherein said adjacent sections of the articuated flexure member have spaced confronting ends carrying respective unaligned projections of equal axial dimensions individually slightly shorter than that of said flexure, whereby axial movement of said adjacent sections toward each other is limited by said projections to a distance equal to the difference between the axial dimensions of said flexure segment and that of the individual projections.

14. A gyroscope assembly according to claim 13 including a flywheel-spin motor assembly disposed within said float and including:
a stator coaxially mounted on said tubular shaft;
a rotor surrounding said stator rotatably mounted on said shaft; and
an annular flywheel rim coaxially mounted on said rotor.

15. A gyroscope assembly according to claim 13 wherein the respective projections on said confronting ends are interdigitated with a small lateral clearance to enable limited relative rotational dispacement of said support members.

References Cited

UNITED STATES PATENTS

| | | | |
|---|---|---|---|
| 2,924,978 | 2/1960 | Barnes | 74—5 |
| 2,928,281 | 3/1960 | Burgwin et. al. | 74—5 |
| 2,990,718 | 7/1961 | Barnaby | 74—5 |
| 3,242,742 | 3/1966 | Parker | 74—5 |
| 3,442,143 | 5/1969 | Schlitt | 74—5.6 |
| 2,852,943 | 9/1968 | Sedgfield | 74—5.7 |
| 2,939,322 | 6/1960 | Sedgfield et al. | 74—5 |
| 3,053,099 | 9/1962 | Bennett et al. | 74—5.4 |

MANUEL A. ANTONAKAS, Primary Examiner

U.S. Cl. X.R.

74—5.4